United States Patent [19]

Klüting et al.

[11] 4,195,881

[45] Apr. 1, 1980

[54] MOTOR DRIVEN RECLINABLE BACKREST WITH ARRESTING DEVICE

[75] Inventors: Bernd Klüting, Radevormwald; Rainer Holweg, Wermelskirchen, both of Fed. Rep. of Germany

[73] Assignee: Keiper Automobiltechnik GmbH & Co. KG, Remscheidt-Hasten, Fed. Rep. of Germany

[21] Appl. No.: 17,161

[22] Filed: Mar. 2, 1979

[30] Foreign Application Priority Data

Mar. 2, 1978 [DE] Fed. Rep. of Germany ....... 2808954

[51] Int. Cl.² ................. B60R 21/10; A47C 1/025
[52] U.S. Cl. .................................. 297/216; 188/69; 192/7; 297/362; 297/379
[58] Field of Search ............... 297/216, 378, 379, 354, 297/355, 362, 363–365; 16/143, 139; 188/69; 192/7; 296/65 A

[56] References Cited

U.S. PATENT DOCUMENTS

| 3,401,979 | 9/1968 | Putsch ............................. 297/366 X |
| 4,113,308 | 9/1978 | Werner et al. .................... 297/379 X |
| 4,147,386 | 4/1979 | Stolper ............................. 297/362 |

*Primary Examiner*—William E. Lyddane
*Attorney, Agent, or Firm*—Michael J. Striker

[57] ABSTRACT

A hinged mount for vehicle seats having reclinable backrest includes a motor driven pivot axle connected to a setting shaft for the angular position adjusting and arresting device. The shaft supports for joint rotation an axially displaceable coupling disk having on each face thereof a ring of coupling teeth. The pinion of the driving motor is in mesh with an idling gear supported on the setting shaft and a cup spring urges the coupling disk into engagement with the idling gear. In the case of accidental rotation of the setting shaft caused by inertial forces acting against the backrest in the case of an accident, for example, the coupling teeth of the coupling disk slide on the toothing of the idling gear and the teeth on the other side of the disk engage an arresting ring which is secured to the reclinable mount part.

6 Claims, 5 Drawing Figures

MOTOR DRIVEN RECLINABLE BACKREST WITH ARRESTING DEVICE

BACKGROUND OF THE INVENTION

This invention relates generally to hinged mounting means for seats having a reclinable backrest, particularly for motor vehicle seats of the type including a stationary mount part secured to the seat portion and an adjustable mount part secured to the backrest, pivot axle for connecting both mount parts and a position adjusting and arresting device arranged at least at one side of the seat between the mount parts and driven by a motor having a driving pinion.

In conventional hinged mounting means of the aforedescribed type, the motor used for adjusting the angular position of the mount part assigned to the backrest, is an electromotor provided with reduction gears terminated with a driving pinion. The motor, gears and pinion are assembled in such a manner as to form a single driving unit. The adjusting and arresting device in conventional hinged mounting means has wobble gears including a gear ring secured to one of the mount parts and defining an internal toothing which cooperates with external toothing of a spur gear secured to the other mount part, the number of teeth of the spur wheel being about one tooth less than the number of teeth of the internal toothing of the gear ring. The spur wheel is rotatably supported on an eccentric section of the pivot axle whereby the eccentricity of this eccentric section relative to the center of the pivot axle corresponds to the difference between the radius of the crown circle of the spur wheel and the radius of the root circle of the internal toothing of the gear ring. The pivot axle thus functions as a setting shaft and enables, due to the wobbling movement of the wobble gears, the angular adjustment of the mount part which is connected to the backrest. Due to the self-locking action of the wobble gears resulting from frictional forces and reinforced by a suitable selection of the eccentricity of the pivot axle, an unintentional movement of the backrest when subject to a normal load cannot occur. If, however, for the sake of an easier adjustability of the hinged mount the frictional forces are reduced by using roller bearings in the wobble gears, the self-locking action can be diminished to such an extent that in the case of an accident the unintentional tilting of the backrest is not excluded and consequently the danger of injury to the user of the seat is increased. In addition, if wobble gears are dimensioned for normally occurring loads acting against the backrest, so in the case of an accident there is a possibility of breakage or deformation of the components of the wobble gears which also may lead to an accidental tilting of the mount part pertaining to the backrest and consequently the danger of injury to the seat user is further increased. The undesired tilting movement of the hinged part connected to the backrest can in such prior art devices be intercepted by designing the transmission in the drive unit as a self-locking worm gear drive. In this case, however, the worm gear drive would have to be over-dimensioned in order to prevent its damage when an accident happens.

SUMMARY OF THE INVENTION

It is, therefore, a general object of the present invention to overcome the aforementioned disadvantages.

More particularly, it is an object of the invention to provide an improved motor-driven hinge mount of the above-described type in which the hinged mount secured to the backrest is prevented from accidental forward and backward tilting.

Another object of this invention is to provide such an improved hinged mount in which the backrest maintains its adjusted angular position even when subject to excessive loads during an accident, without transmitting the excessive acceleration forces to the reduction gears of the driving unit.

In keeping with these objects, and others which will become apparent hereafter, one feature of the invention resides, in hinged mounting means of the aforedescribed type, in a combination which comprises a setting shaft which preferably is connected to the pivot axle, an intermediate gear supported for a free rotation on the shaft and being in mesh with the driving pinion, a coupling disk or wheel supported for joint rotation and for an axial movement on the shaft, an arresting ring secured to one of the mount parts around the shaft, and means for axially urging the coupling wheel into a driving position in which it is coupled to the intermediate gear and, alternatively, into an arresting position in which it is coupled to the arresting ring.

In this manner it is attained that in the case of an overload, the high acceleration forces acting against the backrest during an accident, for example, bypass the reduction gears of the driving electromotor so that the latter is subject only to the force which is needed for the adjustment of the backrest. By virtue of the automatic shifting of the coupling disk from its driving position in which it is connected to the intermediate driving gear into an arresting position in which it is connected to the arresting ring which is secured to the reclinable mount part, both mount parts are rigidly coupled one to another practically without any possibility to tilt and consequently they result into a mount unit forming a fixed angle. The arresting device according to this invention thus prevents effectively any tilting of the backrest during an accident and can be constructed of a few simple construction parts which are also easy to install.

In order to insure a reliable coupling between the coupling wheel and the idling intermediate drive gear for permitting the angular adjustment of the backrest under normal load conditions and also to enable a reliable axial shifting of the coupling wheel into engagement with the arresting ring on the movable mount part when an accident occurs, the arresting ring according to one feature of this invention is provided on the side thereof which faces the coupling wheel with a ring-shaped face toothing; similarly, the coupling wheel is provided on each lateral face with a similar ring-shaped toothing and the side of the intermediate gear facing the coupling wheel is also provided with a face toothing matching the opposite toothing on the coupling wheel. Preferably, the ring-shaped face teeth on the arresting ring, on the coupling wheel and on the intermediate gear are concentrically arranged about the setting shaft and all the teeth have mutually fitting lengths.

According to another feature of this invention, not only the teeth of the arresting ring and of the intermediate idling gear are surface of face teeth, but also the rings of teeth on both sides of the coupling wheel are face teeth so that during the axial movement of the coupling wheel in either of its two positions it is always insured that the two juxtaposed rings of face teeth engage each other.

The arresting device for hinged mounts according to this invention can be employed in many different constructions of motor driven hinged mounts having different adjusting and arresting devices such as, for example, screw drives, worm gear drives and the like. The setting shaft in these embodiments is a component part of the arresting unit. In hinged mounts, however, where the adjusting and arresting device consists of wobble gears controlled via an eccentric which is arranged on the pivot axle, the setting shaft with advantage is connected to the pivot axle or is formed as the pivot axle itself so that a compact construction unit acting simultaneously as an arresting device is achieved.

According to another feature of this invention the coupling wheel is urged into its driving position in which it is in engagement with the intermediate driving gear by means of a cup spring abutting against the movable mount part so that during the normal angular adjustment of the backrest the coupling engagement between the coupling wheel and the intermediate gear is always maintained. The cup spring is dimensioned in such a manner that under normal operating conditions the coupling between the coupling wheel and the intermediate gear is maintained whereas during an accident the coupling wheel is displaced in axial direction against the force of the spring due to the sliding movement of its face teeth on the inclined surfaces of the face toothing of the intermediate gear.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3b is a sectional view of another embodiment of the arresting and coupling teeth of FIG. 3a; and FIG. 3c is still another embodiment of the teeth of FIG. 3a.

DESCRIPTION OF THE PREFERRED EMBODIMENTS

Figure 2:
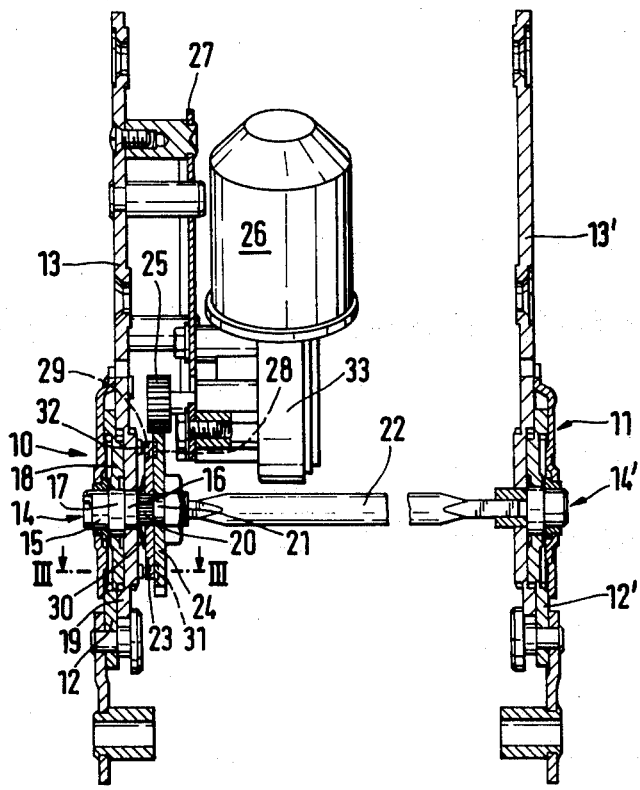
FIG. 2 is a sectional front view taken along the line II—II of FIG. 1 of a pair of hinged mounts arranged at lateral sides of the seat whereby the arresting mechanism of this invention is arranged on the left-hand mount part.

A non-illustrated seat part and a backrest of a vehicle seat are adjustably hinged one to another by hinged mounts 10 and 11. Each hinged mount includes a lower mount part 12 or 12' secured to the seat and an upper mount 13 or 13' secured to the backrest, whereby the two mount parts are pivotably connected one to another by means of a pivot axle 14 or 14'. Since both hinged mounts 10 and 11 are identical as far as their construction and operation is concerned, except the provision of a setting shaft in their pivot axles 14 or 14' it is sufficient for proper understanding this invention, to describe in detail only the hinged mount 10 and to point out its differences with respect to the adjustable hinged mount 11.

Pivot axle 14 which serves for coupling both mount parts 12 and 13 defines two lateral centric sections 15 and 16 and an intermediate eccentric section 17. A spur wheel 18 formed as a one-piece by precision stamping and flow pressing on the seat mount part 12 is rotatably supported on the eccentric section 17 and egages with its external teeth the internal teeth of a gear ring 19 which is secured to the adjustable mount part 13 and is pivotably supported via a wall bridge on the centric sections 16 of pivot axle 14. The internal teeth of gear ring 19 and the external teeth of spur wheel 18 are arranged in such a manner that the crown circle of spur gear 18 is smaller at least about the height of one tooth than the root circle of the internal teeth of the gear ring 19. As a consequence, a number of the external and internal teeth are always in mesh with one another so that a self-locking action between spur gear 18 and gear ring 19 and consequently between the mount parts 12 and 13 always takes place. The eccentricity of the eccentric section 17 with respect to the centric sections 15 and 16 corresponds to the difference between the radius of the root circle of the internal teeth of gear ring 19 and the radius of the crown circle of the external teeth of spur gear 18. The pivot axle 14 forms together with spur gear 18 and the gear ring 19 and the aforementioned wobble gears. A centric pin or shaft 20 having, for example, a wedge-like configuration engages a bolt-shaped extension 21 which on its outer face has a non-circular boring for receiving the end of a connection rod 22 which transfers rotary moment from one hinged mount 10 to the other hinged mount 11. The shaft 20 is axially connected to the pivot axle 14 and supports for a joint rotation an axially displaceable coupling disk 23; the bolt-like attachment 21 of the pivot axle 14 supports for a free rotation an idling intermediate gear 24. The intermediate gear 24 meshes with a driving pinion 25 of a driving electromotor 26 which in the illustrated embodiment is a part of a driving unit which is secured to the reclinable mount part 13 by means of a backrest plate 27.

The coupling wheel or disk 23 is provided on both faces in the range of its circumference with face teeth 28 and 29. A cup spring 30 resting on the upper mount part 13 presses the disk 23 against the side of intermediate gear 24. A corresponding ring of face teeth 31 is provided on the facing side of the intermediage gear 24. In a driving axial position of the coupling disk 23 the teeth 28 on one side of the coupling disk engage the teeth 31 on the face of intermediate gear 24. The cup spring 30 is dimensioned such that under normal operational conditions of the adjustment device the coupling disk 23 is axially displaced and held in the aforementioned driving position in which it is coupled for joint rotation with the intermediate driving gear 24 and thus rotates the setting shaft 20 and pivot axle 14. The arresting ring 32 is formed by face teeth projecting from the adjustable mount part 13 at a radial distance from the center of shaft or axle 14 which corresponds to the radius of the toothing on the facing side of coupling disk 23. The teeth of arresting ring 32 and of coupling disk 23 have approximately the same length so that when disk 23 is axially shifted against the arresting ring 32, the two sets of teeth interlock with each other.

Figure 3A:
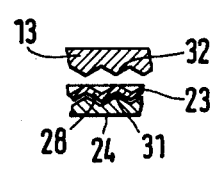
FIG. 3a is one embodiment of the arresting and coupling teeth in the device of this invention, taken along the line III—III of FIG. 2.
Figure 3B:
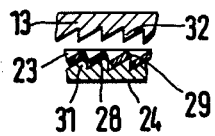
Figure 3C:
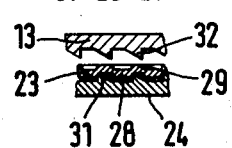
Figure 1:
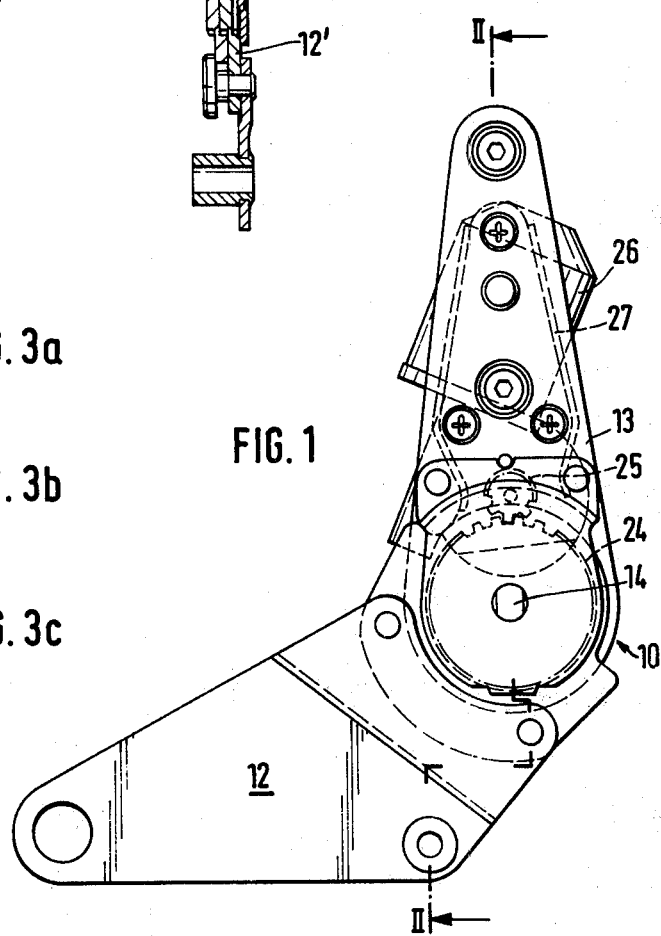
FIG. 1 is a side view of a motor-driven hinged mount for vehicle seats.

The configuration of the toothing of coupling plate 23 as well as of arresting ring 32 and face teeth 31 of intermediate gear 24 are illustrated in FIGS. 3a–3c. In the embodiment as illustrated in FIG. 3a, the tooth rings 28 and 29 of coupling disk 23 as well as the toothing 31 and the arresting ring 32 are face teeth such as, for example, Hirth-type separations. In the embodiments illustrated in FIGS. 3b and 3c the ring 31 and the ring 32 have face sawteeth. The adjoining face toothings 28 and 29 of coupling disk 23 in the embodiment according to FIG. 3b have corresponding sawteeth shape, whereas in FIG. 3c the adjoining rings of teeth 28 and 29 are in the form of rectangular embossed and recessed portions.

The actuated electromotor 26 drives reduction gears 33 made preferably as worm gears having a driving pinion 25 which is in mesh with the idling intermediate gear 24. As seen from FIG. 2, the ring 31 of face teeth of the intermediate gear 24 is interlocked with the gear ring 28 of coupling disk 23. As it has been mentioned above, the cup spring 30 which bears on the mount part 13 urges the coupling disk 23 into its driving position in engagement with the intermediate gear so that the coupling disk which is connected for joint rotation with the shaft 20 and 14 transmits the rotary moment from the driving pinion to the shaft. The shaft 20 in this embodiment forms also the pivot axle 14 and defines an eccentric section 17 which during its rotation adjusts via the aforementioned wobble gears the angular position of the mount part 13 relative to the stationary mount part 12.

If, due to a head-on collision for example, excessive acceleration forces act against the backrest, then even if the self-locking action of the wobble gears does not occur the accelerated rotary movement of the backrest is transmitted to the setting shaft 14. The driving motor 26 is immobile and consequently its driving pinion 25 holds the intermediate idling gear 24 in a fixed position. Due to the rotary movement of the setting shaft 14 and thus of the coupling disk 23, the toothing 28 of the coupling disk slides on the inclined surfaces of the teeth 31 of the intermediate gear so that coupling disk is shifted in axial direction against the pressure of spring 30 and its opposite toothing 29 engages the toothing of arresting ring 32 so that the coupling disk 23 firmly couples the shaft 14 and thus the stationary mount part 12 to the reclinable mount part 13. Consequently, any further rotation of setting shaft 14 is prevented and the backrest maintains its adjusted angular position even in the case of an accident.

It will be understood that each of the elements described above, or two or more together, may also find a useful application in other types of constructions differing from the types described above.

While the invention has been illustrated and described as embodied in a hinged mount for motor vehicle seats, it is not intended to be limited to the details shown, since various modifications and structural changes may be made without departing in any way from the spirit of the present invention. For instance, the axially movable serated coupling disk which is rotatable jointly with the setting shaft is applicable also in other types of hinged mounts which do not emply wobble gears but instead use different kinds of adjusting and arresting devices such as a screw drive, worm gear drive and the like.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a hinged mounting means for seats having a reclinable backrest, particularly for motor vehicle seats, of the type including a stationary mount part secured to the seat portion and an adjustable mount part secured to the backrest, a pivot axle for connecting both mount parts, and a position-adjusting and arresting device arranged at least at one side of the seat between said mount parts and driven by a motor having a driving pinion, a combination comprising a setting shaft coupled to said pivot axle, an intermediate gear supported for free rotation on said shaft and being in mesh with said driving pinion, a coupling wheel supported for joint rotation and for axial movement on said shaft, an arresting ring secured to one of said mount parts around said shaft, and means for axially urging said coupling wheel into a driving position in which it is coupled to said intermediate gear and alternatively, into an arresting position in which it is coupled to said arresting ring.

2. The combination as defined in claim 1, wherein said arresting ring is formed of a ring of arresting teeth, said intermediate gear including a set of coupling teeth and said coupling wheel including two sets of coupling teeth, one set cooperating with said arresting ring and the other set cooperating with said intermediate gear.

3. The combination as defined in claim 2, wherein the toothing of said arresting ring and of said intermediate gear as well as the two sets of teeth of said coupling wheel are arranged opposite each other at a substantially equal radial distance from said setting shaft and having a substantially equal length.

4. The combination as defined in claim 2, wherein the toothing of said arresting ring, of said coupling disk and of said intermediate gear is in the form of interfitting face teeth.

5. The combination as defined in claim 1, wherein said adjusting and arresting device includes wobble gears and an eccentric section on said pivot axle for actuating said wobble gears, said setting shaft being axially connected to said pivot axle.

6. The combination as defined in claim 2, wherein said means for axially urging said coupling wheel include a cup spring arranged for resiliently pressing said coupling wheel into engagement with the coupling teeth of said intermediate gear, and said coupling teeth of the intermediate gear defining inclined surfaces which in the case of accidental rotation of said setting shaft displace said coupling wheel against said spring to engage the toothing of said arresting ring.

* * * * *